United States Patent [19]

Flood

[11] Patent Number: 5,413,870
[45] Date of Patent: May 9, 1995

[54] DECORATIVE BATHROOM PANEL INCLUDING EMBEDDED FABRIC

[76] Inventor: Christopher J. Flood, 812 Southview Dr., Jupiter, Fla. 33458

[21] Appl. No.: 176,728

[22] Filed: Jan. 3, 1994

[51] Int. Cl.6 .............................................. B32B 9/00
[52] U.S. Cl. ................................ 428/542.2; 428/35.9; 428/168; 428/172; 428/195; 428/203; 428/212; 428/286; 428/354; 428/430; 428/904.4
[58] Field of Search ............... 428/203, 204, 354, 172, 428/142, 480, 35.9, 195, 327, 908.8, 168, 212, 286, 430, 904.4

[56] References Cited

U.S. PATENT DOCUMENTS

| | | | |
|---|---|---|---|
| 3,616,144 | 10/1971 | Kenney | 428/241 |
| 4,666,762 | 5/1987 | Yamamoto | 428/216 |
| 4,746,560 | 5/1988 | Goeden | 428/203 |
| 4,801,495 | 1/1989 | van der Hoeven | 428/286 |
| 4,816,317 | 3/1989 | Balmer et al. | 428/172 |

*Primary Examiner*—Patrick J. Ryan
*Assistant Examiner*—Abraham Bahta
*Attorney, Agent, or Firm*—Malin, Haley, DiMaggio & Crosby

[57] ABSTRACT

An improved decorative wall covering that gives the fabric-like appearance but that can be used in high humidity areas such as bathrooms or showers comprising a laminate made up of acrylic cast clear plastic sheet, a clear polyester resin layer, a fabric having a print thereon connected to the clear polyester resin, another layer of polyester resin on the other side of the fabric and a pigmented resin polyester all forming a sturdy laminate that can be cut in sheets and attached on wall surfaces.

5 Claims, 1 Drawing Sheet

DECORATIVE BATHROOM PANEL INCLUDING EMBEDDED FABRIC

BACKGROUND OF THE INVENTION

1. Field of the Invention

This invention relates generally to decorative waterproof laminate panels for use in a bathroom or shower area, and in particular to an improved interior wall panel that is mildew resistant and that includes a decorative fabric embedded in a laminate sheet that can be permanently affixed to conventional wall surfaces, especially in areas of high humidity.

2. Description of the Prior Art

The use of ornate but functional construction materials such as tile in bathroom and shower areas is well known. Laminate structures are also known that include decorative and ornate characteristics combined with functional aspects for use in decorating and construction.

Bathroom and shower areas are subject to high humidity at various periods of time which often results in mildew forming on wall surfaces, requiring extensive cleaning. Because of the conditions of high humidity there are severe limitations on the use of decorative wall coverings such as fabrics and even wallpapers in bathroom areas because of the humidity restrictions. Decorative tiles which have been used in the past are expensive both in their construction and application. U.S. Pat. No. 5,000,810 issued to Michael Silverstein, Mar. 19, 1991 shows a decorative laminate and a method for making the same. As shown, a surface laminate provides a paper substrate wall covering having a surface laminate film to protect the composite material. U.S. Pat. No. 4,693,926 issued to Kowalski et al., Sep. 15, 1987 shows a multi laminate fire resistant decorative material that could be used for bulkhead panels in commercial aircraft. U.S. Pat. No. 4,089,724 issued to Bomboire, May 16, 1978 shows a composite textured product and a method of manufacturing. The product discloses a composite vinyl sheet material suited for floor or wall coverings.

Decorative materials such as fabrics are utilized for wall coverings, particularly for matching certain patterns that are used on furniture fabrics with wall decorations. Fabrics are not suitable in areas of high humidity such as bathrooms or showers in view of mildew problems and the like. Any wall covering material used in a bathroom should be able to be thoroughly cleaned even with harsh chemicals such as bleach to ensure the cleanliness of the area.

The present invention provides for a durable, aesthetically pleasing wall covering especially useful for bathroom areas and shower areas subject to high humidity and water that can be cost effective in its use and relatively uncomplex to manufacture. The invention allows for a great variety in the decorative an aesthetic patterns and designs that can be utilized based on numerous different styles of fabric patterns. The present also provides a unique appearance which allows visual fabric displays to be utilized as a wall covering.

SUMMARY OF THE INVENTION

This invention relates to a sturdy wall covering especially useful in a bathroom or shower area, the wall covering being comprised of a laminate that includes a clear or transparent acrylic cast in the first layer, a clear polyester resin in the second layer, a thin fabric sheet as the third layer and a pigmented resin polyester coated over the fabric layer.

The invention is comprised essentially of a visible fabric and fabric pattern particularly visible on a preselected side that is saturated, capsulated and laminated to provide a flat planar wall covering or wall panel that displays the aesthetic appearance of the fabric through a clear acrylic plastic while the fabric is completely isolated from ambient water or humidity to avoid mildew or water damage to the fabric.

In the construction of the invention, the panels may be of any particular size and in the examples used can be 5' to 10' rectangles or squares or any combination thereof or any other size suitable for use as a wall covering that permits mounting onto the wall surface itself. The wall covering panels, in accordance with the invention, are independent units once created which are individually affixed by adhesive to the dry wall surface in a size as desired.

Because of the large sheets available with the present invention the use of small segmented pieces such as tiles is eliminated in that large sections of walls can be covered very quickly using large independent sheets or panels of the instant invention.

Each independent panel is attached to a wall surface by conventional adhesive such as paste or glue known under the trademark Liquid Nail.

The primary, first layer of the invention is a molded piece or cast piece of acrylic clear plastic of substantial thickness compared to the other laminates. Thus the acrylic panel can have curved edges on one side and be approximately a half inch thick. On one side of the acrylic cast panel, a clear polyester resin is coated to which the next layer, which is the fabric, is placed. A roller is used to get all air bubbles out of the clear polyester resin so that the fabric can attach firmly to the acrylic cast panel. The aesthetic side (front) of the fabric to be displayed is covered with and attached to the clear polyester resin and to the acrylic panel.

The back side of the fabric is coated with a pigmented resin polyester which completes the job of encapsulating the fabric and acts as a secondary adhesive. Now the fabric is firmly mounted as a laminate to the acrylic plastic sheet. Once the resins have hardened the sheet is ready for usage. The pigmented resin polyester is selected in color to act as an opaque backup color behind the fabric to enhance color in the background of fabric. The color varies with the fabric colors. The fabric design would typically be an ornate print for enhanced aesthetic appearance. With the clear acrylic plastic and polyester resin the fabric pattern will be unimpaired visually.

Because of the durability of each panel, the surface of the panel can easily be cleaned even with bleach or bleach like soaps which are necessary often in bathroom environments. Although the device is mainly used for bathrooms, the invention could be used in other environments—kitchen or any other areas for decorative appearance purposes and easy cleaning.

A plurality of individual panels are attached by adhesive to a wall. A polyseam seal is added between panels with a silicone caulking.

It is an object of this invention to provide an improved building interior wall panel for use especially in bathrooms or showers that are subject to humidity that allows a fabric display.

Another object of this invention is to provide a low cost wall covering that is decoratively useful, aesthetically pleasing, and easy to clean.

Yet, still another object of this invention is to provide a decorative wall covering that can saturate, encapsulate, and laminate a decorative fabric to give a fabric-like appearance on a wall surface that is easy to clean to remove mildew.

In accordance with these and other objects which will become apparent hereinafter, the instant invention will now be described with particular reference to the accompanying drawings.

DESCRIPTION OF THE PREFERRED EMBODIMENTS

Figure 1:
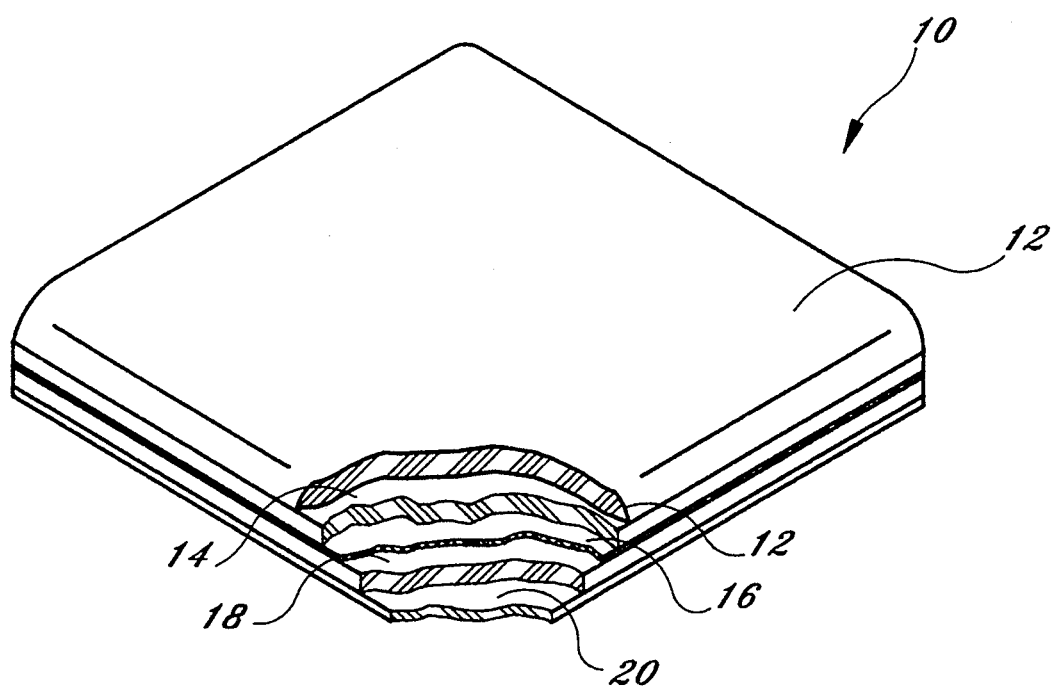
FIG. 1 shows a perspective view of the invention partially cut away to show the laminate surfaces.

Referring now to the drawings and in particular FIG. 1, the present invention is shown generally at 10 comprised of a rectangular wall panel having a first top layer 12 of an acrylic cast clear plastic approximately one-half inch thick with rounded corners on one side and a flat portion on the other side. Affixed to the flat underside of the clear cast acrylic sheet 12 is a clear polyester resin 14 that is coated throughout one side of the plastic sheet 12.

Printed fabric 16 is attached by the clear polyester resin 14 to the acrylic plastic sheet 12 with the decorative or aesthetic side being contacted by the clear polyester resin which acts like a glue to bind the fabric to plastic sheet 12.

A roller may be used to push the fabric in direct contact with the clear polyester resin 14 and the acrylic sheet 12 to eliminate bubbles. Another clear polyester resin coating is placed on the other side of the fabric to saturate and encapsulate the fabric 16. Finally, a pigmented resin polyester material 20 is placed against the clear polyester resin 18 so that the encapsulated fabric is bonded to the acrylic cast plastic sheet 12.

Figure 2:
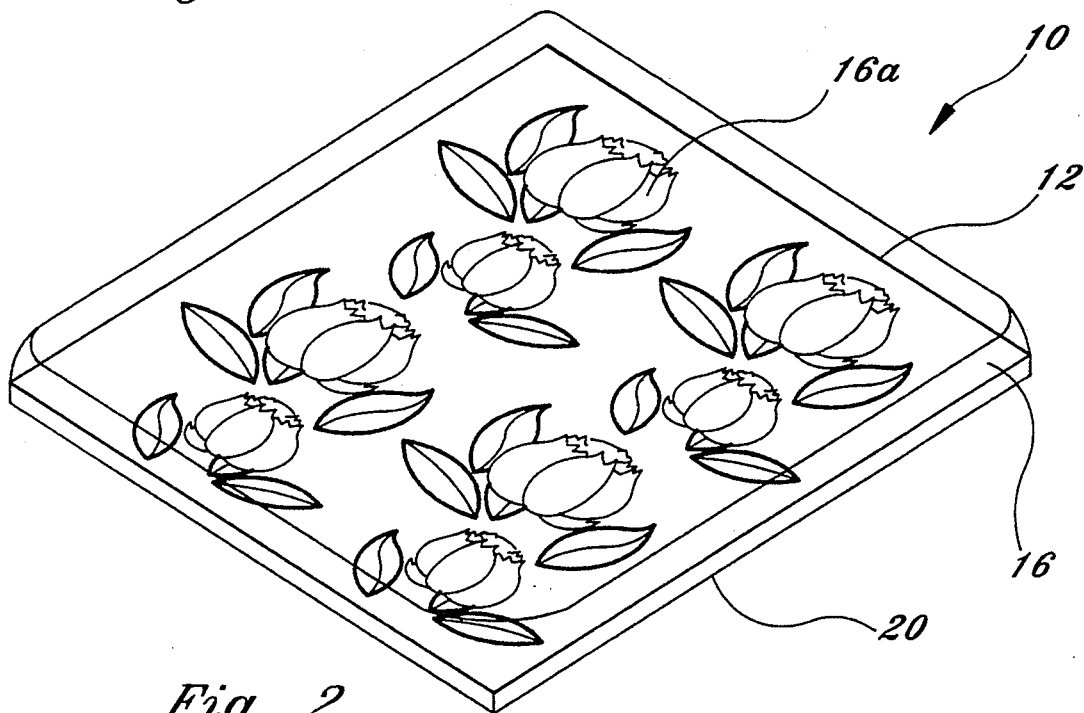
FIG. 2 shows a top perspective view of the invention.

The panel 10 is shown in FIG. 2 that includes a plurality of printed patterns 16a emanating from the fabric sheet 16 through the clear plastic acrylic sheet 12 and the clear polyester resin 14. Thus, the panel 10 is shown to be ready to attach to a wall surface once the resins have hardened.

Figure 3:
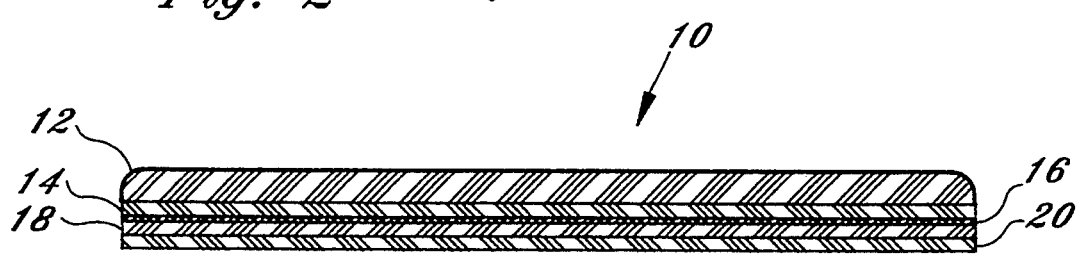
FIG. 3 shows a cross-sectional view of the invention in front elevational.

FIG. 3 shows the invention 10 and the relative thickness of the top sheet 12 which is the acrylic plastic sheet with clear polyester resin 14 coated on one side to fabric 16 which again is coated by clear polyester resin 18 and pigmented resin polyester 20. The pigmented resin is colored to match the fabric to enhance the background which is opaque. For example, a pink fabric will use a pink pigmented resin polyester as background.

Referring back to FIG. 2 a rigid panel is shown that allows for clear visual perception of the fabric pattern 16a. The panel can be sized in any desired size, even up to 10 foot lengths.

To construct the invention the acrylic sheet 12 is cast in a mold to a desired thickness and shaped typically with a flat planar surface on each side and bevelled or curved edges on one side. The clear polyester resin is applied and coated over one side of the acrylic sheet 12. The fabric 16 is then pressed firmly against the clear polyester resin 14 with a roller so that bubbles are removed which would otherwise impede the visual appearance of the fabric. Again, a clear polyester resin 18 is coated over the fabric. Finally, the pigmented resin polyester 20 is coated over the clear polyester resin and fabric 20 which attaches the entire unit together as a single laminate as shown in FIG. 3.

Once the resins 14, 18, and 20 have hardened, the panel can be mounted to a wall surface or bathroom shower vertical surface through conventional adhesives. The panels can be cut to desired lengths and manufactured in very large sheets if necessary. The panels may be utilized in other environments other than bathroom or shower areas, especially in areas of high humidity.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A decorative wall covering especially useful for areas of high humidity or water vapor to resist mildew, said wall covering including a fabric ornamental appearance, said wall covering comprising:
    a clear plastic sheet of a predetermined length and width said sheet being planar and flat on both sides;
    a first layer of clear polyester resin attached to one side of said plastic sheet;
    a sheet of fabric, said fabric having a print disposed thereon, said fabric attached throughout to said first layer of clear polyester resin;
    a second layer of clear polyester resin attached to one side of said fabric; and
    a pigmented resin polyester layer attached to said second clear polyester resin layer, said pigment color selected to enhance the background of said fabric, thereby forming a laminate that is durable that provides a aesthetic appearance of fabric and can be used in a high humidity environment whereby the panel is attached to a wall surface.

2. A device as in claim 1, wherein: said plastic sheet is a cast acrylic.

3. A device as in claim 1, wherein said plastic sheet has curved edges on one side.

4. A device as in claim 1, wherein said panel is attachable to a wall surface.

5. A device as in claim 1, wherein said fabric is saturated, encapsulated and laminated within clear polyester resin for protecting the fabric from humidity.

* * * * *